US012152737B2

(12) United States Patent
Tuo et al.

(10) Patent No.: US 12,152,737 B2
(45) Date of Patent: Nov. 26, 2024

(54) SYSTEM AND METHOD FOR CRYOGENIC VAPORIZATION USING CIRCULATING COOLING LOOP

(71) Applicants: Hanfei Tuo, East Amherst, NY (US); Chao Liang, East Amherst, NY (US); Maulik R. Shelat, Williamsville, NY (US); Sang Muk Kwark, Holly Springs, NC (US); Seth A. Potratz, Grand Island, NY (US)

(72) Inventors: Hanfei Tuo, East Amherst, NY (US); Chao Liang, East Amherst, NY (US); Maulik R. Shelat, Williamsville, NY (US); Sang Muk Kwark, Holly Springs, NC (US); Seth A. Potratz, Grand Island, NY (US)

(73) Assignee: Praxair Technology, Inc., Danbury, CT (US)

( * ) Notice: Subject to any disclaimer, the term of this patent is extended or adjusted under 35 U.S.C. 154(b) by 329 days.

(21) Appl. No.: 17/516,984

(22) Filed: Nov. 2, 2021

(65) Prior Publication Data

US 2022/0290815 A1 Sep. 15, 2022

Related U.S. Application Data

(60) Provisional application No. 63/159,585, filed on Mar. 11, 2021.

(51) Int. Cl.
*F17C 9/02* (2006.01)

(52) U.S. Cl.
CPC .................................... *F17C 9/02* (2013.01)

(58) Field of Classification Search
CPC ................ F17C 9/02; F17C 2223/0161; F17C 2223/033; F17C 2223/046;
(Continued)

(56) References Cited

U.S. PATENT DOCUMENTS 3,726,085 A * 4/1973 Arenson .................. F17C 9/02 60/648
4,819,454 A * 4/1989 Brigham .................. F17C 9/02 60/648
(Continued)

FOREIGN PATENT DOCUMENTS

CN 205505842 U 8/2016
CN 210107040 U 2/2020
(Continued)

*Primary Examiner* — Miguel A Diaz
*Assistant Examiner* — Ibrahim A. Michael Adeniji
(74) *Attorney, Agent, or Firm* — Robert J. Hampsch

(57) ABSTRACT

A cryogenic vaporization system and method are provided. A first heat exchanger heats a liquid cryogen via indirect heat exchange to output a cryogenic vapor at a first temperature. A second heat exchanger receives the cryogenic vapor at the first temperature. The second heat exchanger heats the cryogenic vapor via indirect heat exchange to a second temperature. The cryogenic vapor at the second temperature is recirculated to the first heat exchanger to heat the liquid cryogen and cool the recirculated cryogenic vapor to a third temperature. A third heat exchanger receives the cryogenic vapor at the third temperature. The third heat exchanger heats the cryogenic vapor to a fourth temperature. The third heat exchanger outputs the cryogenic vapor at the fourth temperature.

5 Claims, 5 Drawing Sheets

(58) Field of Classification Search

CPC ...... F17C 2225/0123; F17C 2227/0135; F17C 2227/0306; F17C 2227/0316; F17C 2227/0323; F17C 2227/0393; F17C 2227/0395; F17C 2260/032; F17C 2260/046; F17C 2265/05; F17C 2270/0136; F17C 9/04; F17C 7/02; F17C 2227/0318

USPC ........................................................... 62/50.2

See application file for complete search history.

(56) References Cited

U.S. PATENT DOCUMENTS

| | | | | | |
|---|---|---|---|---|---|
| 5,095,709 | A * | 3/1992 | Billiot | F17C 9/02 | 60/648 |
| 5,255,525 | A * | 10/1993 | Wieland | F17C 9/02 | 62/46.1 |
| 5,390,500 | A | 2/1995 | White et al. | | |
| 5,570,582 | A * | 11/1996 | Sweeney | F25J 3/08 | 62/641 |
| 6,644,041 | B1 | 11/2003 | Eyermann | | |
| 8,069,677 | B2 | 12/2011 | Faka | | |
| 8,662,149 | B1 | 3/2014 | Bernert, Jr. et al. | | |
| 8,776,535 | B1 | 7/2014 | Bernert, Jr. et al. | | |
| 2001/0008126 | A1* | 7/2001 | Iwasaki | F17C 7/04 | 122/31.1 |
| 2007/0012050 | A1* | 1/2007 | Brown | F17C 7/04 | 62/275 |
| 2009/0211263 | A1* | 8/2009 | Coyle | F25J 3/0233 | 62/50.2 |
| 2009/0259081 | A1* | 10/2009 | Lee | C10L 3/10 | 585/14 |
| 2010/0043453 | A1 | 2/2010 | Mak | | |
| 2010/0101240 | A1 | 4/2010 | Mak | | |
| 2011/0167824 | A1* | 7/2011 | Mak | F17C 9/02 | 60/671 |
| 2011/0297346 | A1 | 12/2011 | Minta et al. | | |
| 2012/0317998 | A1* | 12/2012 | Bokker | F17C 9/02 | 62/50.2 |
| 2013/0111928 | A1 | 5/2013 | Bernert, Sr. et al. | | |
| 2013/0291567 | A1* | 11/2013 | Bohra | F17C 5/06 | 62/48.1 |
| 2018/0187837 | A1* | 7/2018 | Peyron | F17C 9/02 | |

FOREIGN PATENT DOCUMENTS

| | | | | |
|---|---|---|---|---|
| JP | 2010-203520 | A | 9/2010 | |
| KR | 100918201 | B1 | 9/2009 | |
| WO | WO-9638656 | A1 * | 12/1996 | F17C 9/02 |

* cited by examiner

SYSTEM AND METHOD FOR CRYOGENIC VAPORIZATION USING CIRCULATING COOLING LOOP

TECHNICAL FIELD

The present disclosure relates generally to cryogenic vaporization systems, and more particularly, to a system for cryogenic vaporization that uses recirculated cryogenic vapor and an existing plant cooling loop for indirect heat exchange.

BACKGROUND

A conventional cryogenic regasification system, as shown in FIG. 1, includes a liquid cryogenic storage tank 102 that outputs liquid cryogen to a control valve 104. The control valve 104 controls the flow of the liquid cryogen to a heat exchanger (or vaporizer) 106. The heat exchanger 106 vaporizes the liquid cryogen into a superheated vapor at about ambient temperature or higher. The superheated vapor is supplied to an end user through a pipeline. Categorization of the heat exchanger 106 is dependent on a heating medium that is used for vaporization. For example, ambient air is used as a heating medium for an ambient air vaporizer (AAV) and a water-based solution is used as a heating medium for a water bath vaporizer (WBV).

If a regasification system is continuously used to supply vaporized gas to an end user, it is referred to as a continuous supply system. If a regasification system is used only when an air separation plant is shut down, it is referred to as a back-up system. A back-up system can also be used for "peak shaving" to supply vaporized gas to an end user for a period of time when the end user's demand exceeds the capacity of the air separation plant. A pipeline within the regasification system is typically made of stainless steel or another cryogenically appropriate material. However, a pipeline to the end user is typically made of carbon steel, which may become brittle at lower temperatures. Therefore, typical piping standards specify a minimum design temperature for carbon steel.

An AAV is an atmospheric vaporizer system that includes one or more passes of vertically positioned tubes or modules, or a bank of AAV units. The exteriors of the tubes are exposed to the ambient atmosphere and have an extended heat transfer surface. The liquid cryogen flows within the tubes where it is vaporized and subsequently superheated, sometimes approaching the ambient atmospheric temperature.

AAV units offer significant advantages over other heat exchangers including, for example, low equipment costs, simple and reliable operation, low maintenance, and low operating costs. However, AAV units suffer from several drawbacks including, for example, a large size and footprint due to low heat transfer performance and decreased performance from ice formation on the tube surfaces. AAV units may also suffer from an extreme sensitivity to ambient conditions. For example, in a relatively cold climate, more units are required in parallel in order to achieve the same production. This may be required even when an additional electric trim heater is installed after the AAV units. AAV units may also produce certain safety hazards, such as, for example, falling ice chunks and fogging when cooler and heavier air forms a "ground air layer" beneath moist warmer air. The cool air collecting around the vaporizer will considerably reduce performance to unacceptable levels during long operation periods.

Attempts that have been made to resolve the above-described issues are complicated, expensive, and impractical to implement. Further, the effectiveness of such attempts remains uncertain. The noted drawbacks of AAV units sometimes require the use of alternative heat exchangers, such as natural gas (combustion) or steam heated WBVs.

A WBV is a vaporizer system that includes a water tank or bath into which a vaporizing coil or tube bundle is submerged for the purpose of transferring heat from the hot water bath to the liquid cryogen flowing through the tubular coil or tube bundle. The coil or bundle is generally made of austenitic stainless steel due to the cryogenic temperature range. Energy is input that maintains the water temperature above a certain level in order to prevent icing on the tube surface. Such energy may be generated from a combustion process within a flue gas heating coil submerged at the bottom of the water tank, or from hot steam that is directly injected into the water tank via steam nozzles. All such energy generation systems require an additional combustion process to generate heat.

WBVs are more expensive due to the cost of the fuel required. WBVs also have an increased complexity and a greater environmental impact due to the combustion, significantly limiting its geographic application.

A heat exchanger may also utilize an intermediate fluid type, which is more often used in liquid natural gas (LNG) regasification than in an air separation plant. Instead of vaporizing liquid cryogen by directly heating the liquid cryogen with hot water or ambient air, a refrigerant (e.g., propane or fluorinated hydrocarbons) having a low freezing point is used. The refrigerant is first heated with hot water or steam in a separate loop, and the superheated refrigerant is used in vaporization of the liquid cryogen, which causes the refrigerant to cool and condense.

The refrigerant can effectively eliminate icing and fogging issues of AAV units and can also result in a compact footprint. However, utilization of an intermediate fluid type requires a heating means for the preparation of the hot water or steam, and is costly to operate due to fuel consumption.

SUMMARY

According to an embodiment, a method for cryogenic vaporization is provided. A first heat exchanger heats a liquid cryogen via indirect heat exchange to output a cryogenic vapor at a first temperature. A second heat exchanger receives the cryogenic vapor at the first temperature. The second heat exchanger heats the cryogenic vapor via indirect heat exchange to a second temperature. The cryogenic vapor at the second temperature is recirculated to the first heat exchanger to heat the liquid cryogen and cool the recirculated cryogenic vapor to a third temperature. A third heat exchanger receives the cryogenic vapor at the third temperature. The third heat exchanger heats the cryogenic vapor to a fourth temperature. The third heat exchanger outputs the cryogenic vapor at the fourth temperature.

According to an embodiment, a cryogenic vaporization system is provided. The system includes a first heat exchanger configured for receiving a liquid cryogen, heating the liquid cryogen via indirect heat exchange with a cryogenic vapor at a first temperature, and outputting a cryogenic vapor at a second temperature. The cryogenic vapor at the first temperature is cooled and output as a cryogenic vapor at a third temperature. The system also includes a second heat exchanger configured for receiving the cryogenic vapor at the second temperature, heating the cryogenic vapor via indirect heat exchange to the first temperature, and recirculating the cryogenic vapor at the first temperature to the first heat exchanger to heat the liquid cryogen. The system further includes a third heat exchanger configured for receiving the cryogenic vapor at the third temperature, heating the cryogenic vapor via indirect heat exchange to a fourth temperature, and outputting the cryogenic vapor at the fourth temperature.

BRIEF DESCRIPTION OF THE DRAWINGS

The above and other aspects, features, and advantages of certain embodiments of the present disclosure will be more apparent from the following detailed description, when taken in conjunction with the accompanying drawings, in which.

DETAILED DESCRIPTION

Figure 1:
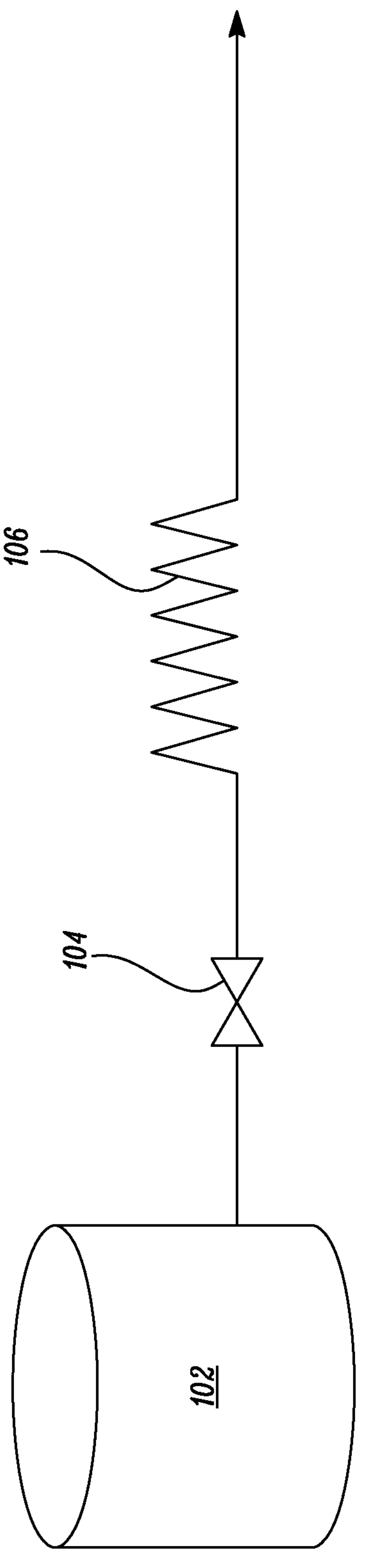
FIG. 1 is a diagram illustrating a cryogenic regasification system.

Hereinafter, embodiments of the present disclosure are described in detail with reference to the accompanying drawings. It should be noted that the same elements will be designated by the same reference numerals although they are shown in different drawings. In the following description, specific details such as detailed configurations and components are merely provided to assist with the overall understanding of the embodiments of the present disclosure. Therefore, it should be apparent to those skilled in the art that various changes and modifications of the embodiments described herein may be made without departing from the scope of the present disclosure. In addition, descriptions of well-known functions and constructions are omitted for clarity and conciseness. The terms described below are terms defined in consideration of the functions in the present disclosure, and may be different according to users, intentions of the users, or customs. Therefore, the definitions of the terms should be determined based on the contents throughout this specification.

The present disclosure may have various modifications and various embodiments, among which embodiments are described below in detail with reference to the accompanying drawings. However, it should be understood that the present disclosure is not limited to the embodiments, but includes all modifications, equivalents, and alternatives within the scope of the present disclosure.

Although the terms including an ordinal number such as first, second, etc. may be used for describing various elements, the structural elements are not restricted by the terms. The terms are only used to distinguish one element from another element. For example, without departing from the scope of the present disclosure, a first structural element may be referred to as a second structural element. Similarly, the second structural element may also be referred to as the first structural element. As used herein, the term "and/or" includes any and all combinations of one or more associated items.

The terms used herein are merely used to describe various embodiments of the present disclosure but are not intended to limit the present disclosure. Singular forms are intended to include plural forms unless the context clearly indicates otherwise. In the present disclosure, it should be understood that the terms "include" or "have" indicate the existence of a feature, a number, a step, an operation, a structural element, parts, or a combination thereof, and do not exclude the existence or probability of the addition of one or more other features, numerals, steps, operations, structural elements, parts, or combinations thereof.

Unless defined differently, all terms used herein have the same meanings as those understood by a person skilled in the art to which the present disclosure belongs. Terms such as those defined in a generally used dictionary are to be interpreted to have the same meanings as the contextual meanings in the relevant field of art, and are not to be interpreted to have ideal or excessively formal meanings unless clearly defined in the present disclosure.

According to an embodiment, a cooling loop, which is already available in an air separation base plant, is utilized in the cryogenic vaporization process for superheating and reheating cryogenic vapor, and liquid cryogen is vaporized utilizing the superheated cryogenic vapor. The cooling loop may be an open water loop in a relatively warmer climate or a closed water-glycol loop in a relatively cooler climate.

Figure 2:
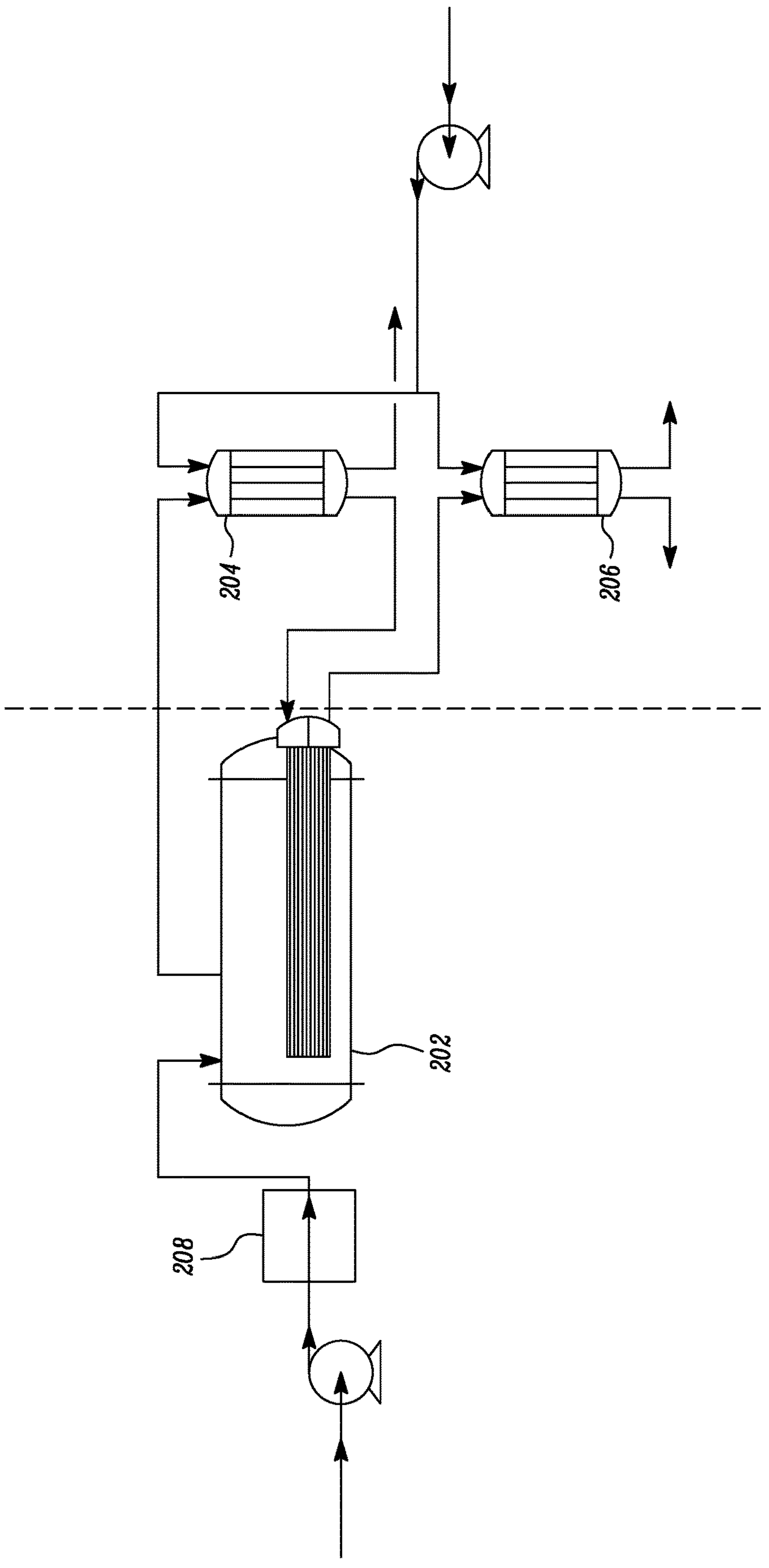
FIG. 2 is a diagram illustrating a vaporization process and system, according to an embodiment of the disclosure.

Referring to FIG. 2, a diagram illustrates a vaporization process and system, according to an embodiment of the disclosure. Sub-cooled liquid cryogen is first pumped to a high pressure and fed into a first heat exchanger 202. The first heat exchanger 202 may be embodied as a reboiler having an icing-free shell that heats the liquid cryogen via indirect heat exchange. A thermal storage unit 208 may be provided upstream of the first heat exchanger 202. The thermal storage unit 208 includes a loose fill material with a high specific heat capacity, such as, for example, rock or a phase change material (PCM) with a proper phase change temperature, that begins the heating process of the sub-cooled liquid cryogen via direct heat exchange. The thermal storage unit 208 provides the liquid cryogen to the first heat exchanger 202 within an approximate temperature range of −200° C. to −150° C. (e.g., −190° C.). In order to perform quick system capacity ramp-up, or if a ballast time is required, the thermal storage unit 208 is configured to perform additional heating of the liquid cryogen to compensate for the reduced heating capacity at the first heat exchanger 202, which may cause severe ice formation in a second heat exchanger 204.

The sub-cooled liquid cryogen is boiled to a saturated cryogenic vapor using a recirculated cryogenic vapor as a heat source. This low-temperature saturated cryogenic vapor is output from the first heat exchanger 202 to a second heat exchanger 204 within an approximate temperature range of −200° C. to −120° C. (e.g., −140° C.). The second heat exchanger 204 may be embodied as a super-heater that superheats the low-temperature cryogenic vapor to approximately an ambient temperature using a circulating water or water-glycol solution. Accordingly, the second heat exchanger operates as a forced flow (circulating) water-based heat exchanger.

The water-based solution is provided to the second heat exchanger 204 from an existing cooling water loop used for compression units of the base plant. The water-based solution is pumped into the second heat exchanger 204 within an approximate temperature range of 10° C. to 50° C. (e.g., 25° C.). Integration with the existing cooling water loop is described in greater detail below with respect to FIG. 4.

Although the cryogenic vapor is at low temperature (e.g., approximately −140° C.) upon entering the second heat exchanger 204, the risk of ice formation on a water-based solution side of the internal tubing can be avoided using proper process conditions and heat exchanger design. Compared to liquid cryogen, cryogenic vapor has a substantially lower heat transfer coefficient and energy density (i.e., specific heat and density). Additionally, the forced flow of the water-based solution maintains a very high heat transfer coefficient (e.g., at magnitudes of 3000 W/m2-K or higher). Therefore, given that heat transfer resistance between the cryogenic vapor and the water-based solution can be manipulated to be above 15:1, the tube wall temperature can be effectively elevated above the freezing temperature of the water-based solution. Additionally, a hydrophobic coating may be applied to the outer surface of the tube in order to prevent formed ice particles from sticking to the surface of the tube. Further, the velocity of the water-based solution can carry away the formed ice particles.

When output from the second heat exchanger 204, the super-heated cryogenic vapor is approximately at an ambient temperature and may be within an approximate temperature range of −5° C. to 40° C. (e.g., 0° C.). The water-based solution is cooled to be within an approximate temperature range of 5° C. to 40° C. (e.g., 10° C.). The water-based solution is returned to the existing cooling water loop, and the super-heated cryogenic vapor is recirculated to the first heat exchanger 202, to be used as the heat source for indirect heat exchange with the liquid cryogen.

Upon being used as the vaporization heat source in the first heat exchanger 202, the super-heated warm vapor is cooled back to a low-temperature cryogenic vapor, and output from the first heat exchanger 202 to a third heat exchanger 206. This low-temperature cryogenic vapor may be within an approximate temperature range of −200° C. to −120° C. (e.g., −140° C.).

The third heat exchanger 206 utilizes the same heating medium as the second heat exchanger 204, and also operates as a forced flow (circulating) water-based heat exchanger. Specifically, the water-based solution is provided to the third heat exchanger 206 from the existing cooling water loop. The water-based solution is pumped into the third heat exchanger 206 within an approximate temperature range of 10° C. to 50° C. (e.g., 25° C.). Integration with the existing cooling water loop is described in greater detail below with respect to FIG. 4.

At the third heat exchanger 206, the water-based solution is cooled to an approximate temperature range of 5° C. to 40° C. (e.g., 10° C.). The water-based solution is returned to the existing cooling water loop. Using the water-based solution, the third heat exchanger 206 heats the cryogenic vapor back to approximately the ambient warm temperature and may be within an approximate temperature range of −5° C. to 40° C. (e.g., 0° C.). This re-heated warm vapor is output from the third heat exchanger 206 as the final gas product to an end user.

In an alternate embodiment, the second heat exchanger 204 and the third heat exchanger 206 may be integrated into a single heat exchanger with a common heating pass.

Figure 3:
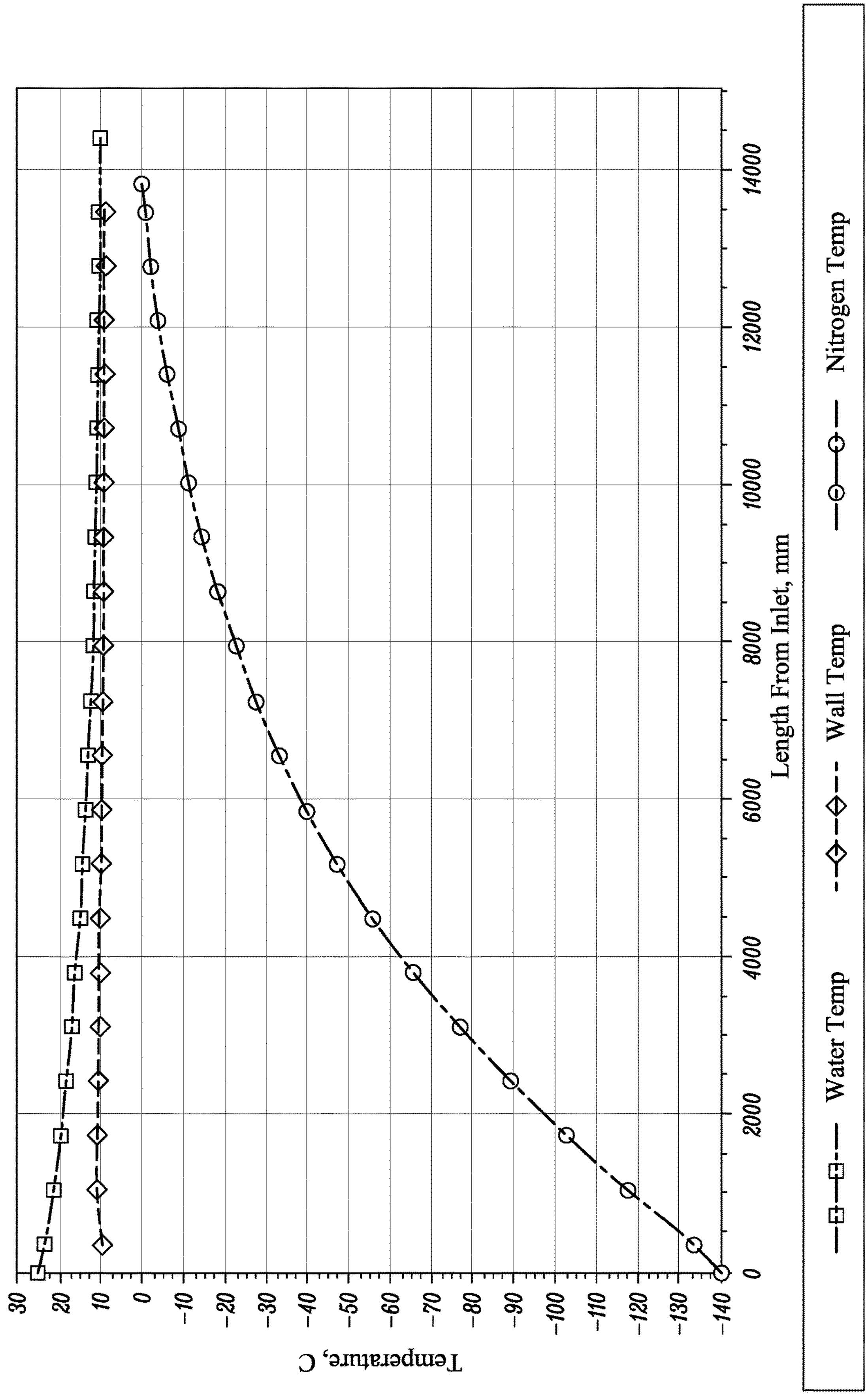
FIG. 3 is a chart illustrating a temperature profile in a super-heater or re-heater of the vaporization system, according to an embodiment of the disclosure.

Referring now to FIG. 3, a chart illustrates a temperature profile along a tube length, according to an embodiment of the disclosure. The tube of FIG. 3 relates to the second heat exchanger 204 or the third heat exchanger 206 of FIG. 2 using, for example, a hair pin type exchanger for reduced size and compactness. In this embodiment, the heat exchanger shell, which contains the tube bundle for indirect heating of cryogenic vapor, may have an outer diameter of approximately 6 inches to 24 inches and an overall length of approximately 10 feet to 40 feet. Alternate embodiments may incorporate different tube dimensions, while achieving similar results described below.

As shown in FIG. 3, at an inlet of the heat exchanger, the cryogenic vapor has a temperature of approximately −140° C., the water-based solution has a temperature of approximately 25° C., and the tube wall of the heat exchanger has a temperature of approximately 10° C., which is well above a water freezing temperature. The water-based solution side of the tube wall has a heat transfer coefficient that is approximately 10-15 times higher than that of the cryogenic vapor side of the tube wall. This difference maintains the tube wall temperature at approximately 10° C., which is the approximate temperature to which the water-based solution decreases as distance from the inlet increases along the tube length. Thus, the tube wall temperature is maintained above the water freezing temperature. Simultaneously, the temperature of the cryogenic vapor within the tube increases to an ambient temperature (approximately, 0° C.).

This feature is enabled by separating liquid vaporization and vapor superheating into two different sections or pieces of heat exchange equipment. Specifically, liquid vaporization is performed at the first heat exchanger 202 of FIG. 2, while vapor superheating is performed at the second heat exchanger 204 and the third heat exchanger 206 of FIG. 2.

Figure 4:
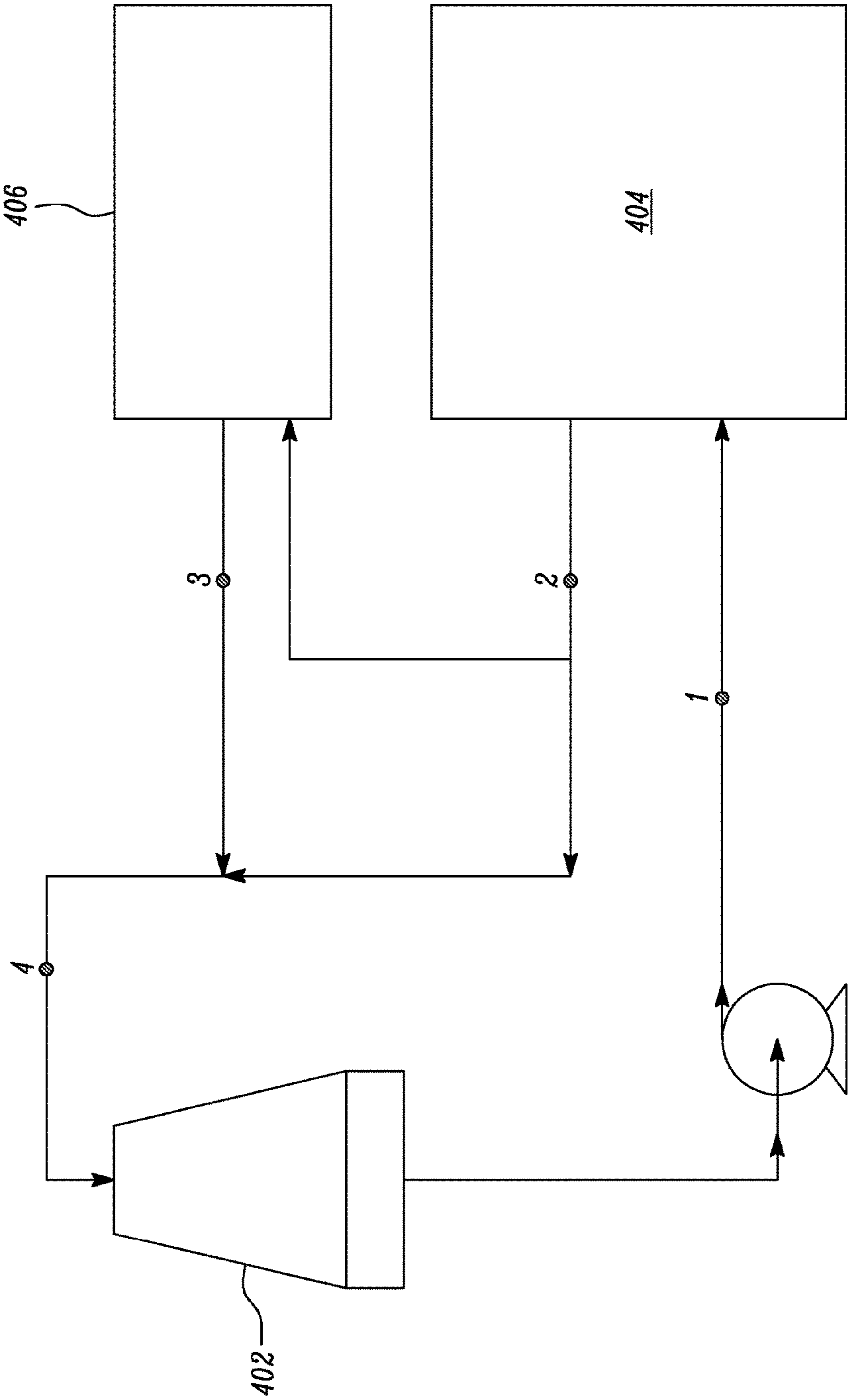
FIG. 4 is a diagram illustrating integration of the vaporization system as a backup system with an air separation base plant, according to an embodiment of the disclosure.

FIG. 4 is a diagram illustrating integration of the vaporization system as a backup system with an air separation base plant, according to an embodiment of the disclosure. In an air separation base plant, a cooling tower 402 is required to provide a cooling water-based solution for compression units, such as, for example, main air compressors. The vaporizer system utilizes the existing cooling water loop and cooling water pump for cryogenic vaporization, without adding equipment and cost.

When a base plant operates and a backup vaporizer system works as "peak shaver", a cooling water-based solution (stream 1), at approximately 10° C. to 25° C., is output from the cooling tower 402 and fed into a base plant 404 for compression inter-stage cooling. This typically results in the solution temperature increasing to approximately 35° C. to 50° C. (stream 2). A portion of the heated solution (stream 2) is fed into a backup vaporizer system 406 to act as an indirect heating source for the cryogenic vapor in the second heat exchanger 204 and the third heat exchanger 206 of FIG. 2, as described above. The solution exits the backup vaporizer system 406 with a decreased temperature of approximately 25° C. to 40° C. (stream 3), and mixes with the remainder of the heated solution from the base plant 404 (stream 2). The mixed solution (stream 4) is fed back into the common cooling tower 402.

In accordance with this embodiment, the vaporization process provides additional cooling to the water-based solution and helps to reduce the working load of the cooling tower 402. Such thermal integration provides additional energy savings for the base plant cooling system. When the base plant shuts down and the backup vaporizer provides all of the cryogenic vapor to the end user, the cooling water-based solution may be directly fed into the vaporization system, and the cooling tower 402 serves as a heating tower to dissipate cold energy into the ambient air. Typically, a size of the cooling tower 402 is dictated by the cooling demand from the base plant, which is approximately 4-6 times the backup vaporization heating duty. Therefore, performance of the cooling tower 402 is sufficient to provide water flow for the backup vaporization process.

Embodiments of the present disclosure reduce icing and fogging hazards, while also significantly reducing the required footprint of the vaporization system due to high heat transfer performance (up to 90% reduction compared to a conventional AAV-based system). There is also no need for additional heating (e.g., natural gas combustion or steam WBV-based systems). The embodiments of the present disclosure utilize the cooling loop and fluid from the base plant process, and therefore, do not require an intermediate fluid loop. The above-described advantages may result in approximately 10-30% cost savings potential.

Figure 5:
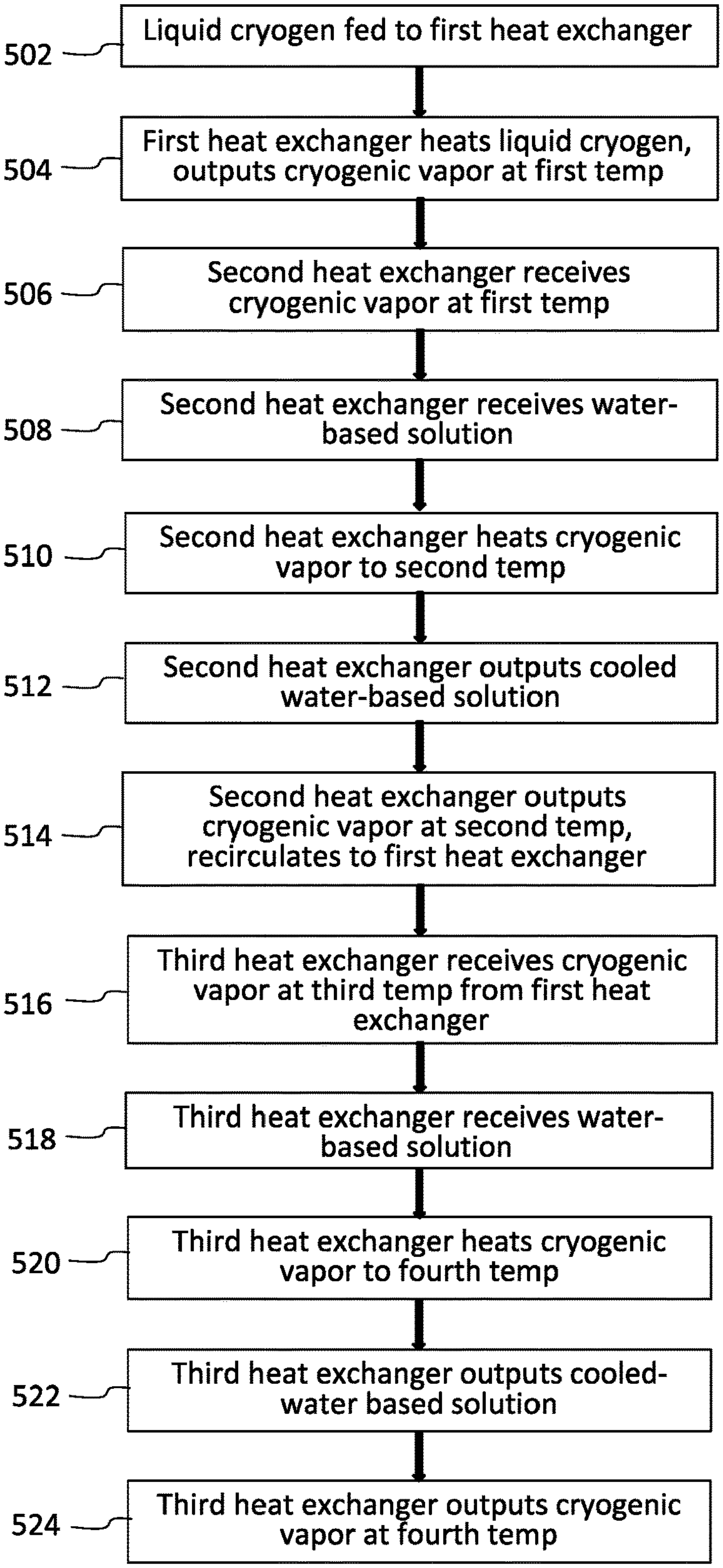
FIG. 5 is a flowchart illustrating a method for the regasification of cryogen, according to an embodiment of the disclosure.

Referring now to FIG. 5, a flowchart illustrates a method for cryogenic vaporization, according to an embodiment of the disclosure. At 502, liquid cryogen is pumped to a high pressure and fed to a first heat exchanger at a temperature of approximately −200° C. to −150° C. The cryogenic liquid may be provided to the first heat exchanger from a thermal storage unit, having a loose fill material with a high specific heat capacity or latent heat, such as, for example, rocks or another PCM with a proper phase change temperature, that begins the heating process of the sub-cooled liquid cryogen via direct heat exchange. At 504, the first heat exchanger heats the liquid cryogen via indirect heat exchange using recirculated cryogenic vapor as the heat source. The first heat exchanger outputs a cryogenic vapor at a first temperature of approximately −200° C. to −120° C.

At 506, a second heat exchanger receives the cryogenic vapor at the first temperature of approximately −200° C. to −120° C. At 508, the second heat exchanger receives a water-based solution from the base plant having a temperature of approximately 10° C. to 50° C. The water-based solution may be a circulating water or water-glycol solution. At 510, the second exchanger heats the cryogenic vapor to a second temperature of approximately −5° C. to 40° C., via indirect heat exchange, using the water-based solution, simultaneously cooling the water-based solution to a temperature of approximately 5° C. to 40° C. The second temperature is approximately an ambient temperature. At 512, the second heat exchanger outputs the cooled water-based solution to the base plant. At 514, the second heat exchanger outputs the cryogenic vapor at the second temperature. The cryogenic vapor is recirculated to the first heat exchanger to heat the liquid cryogen via indirect heat exchange, simultaneously cooling the recirculated cryogenic vapor to a third temperature of approximately −200° C. to −120° C.

At 516, a third heat exchanger receives the cryogenic vapor at the third temperature of approximately −200° C. to −120° C. At 518, the third heat exchanger receives the water-based solution from the base plant having a temperature of approximately 10° C. to 50° C. The water-based solution may be a circulating water or water-glycol solution. At 520, the third heat exchanger heats the cryogenic vapor to a fourth temperature of approximately −5° C. to 40° C. using the water-based solution, via indirect heat exchange, simultaneously cooling the water-based solution to 5° C. to 40° C. The fourth temperature is approximately an ambient temperature. At 522, the third heat exchanger outputs the cooled water-based solution to the base plant. At 524, the third heat exchanger outputs the cryogenic vapor at the fourth temperature for provision to an end-user.

Although certain embodiments of the present disclosure have been described in the detailed description of the present disclosure, the present disclosure may be modified in various forms without departing from the scope of the present disclosure. Thus, the scope of the present disclosure shall not be determined merely based on the described embodiments, but rather determined based on the accompanying claims and equivalents thereto.

What is claimed is:

1. A method for cryogenic vaporization comprising the steps of:

receiving a sub-cooled liquid cryogen from an air separation plant;

heating the sub-cooled liquid cryogen from the air separation plant via direct heat exchange in a thermal storage unit to produce a liquid cryogen;

receiving the liquid cryogen at a first heat exchanger;

vaporizing the liquid cryogen via indirect heat exchange in the first heat exchanger against a superheated cryogenic vapor to output a cryogenic vapor at a first temperature;

receiving the cryogenic vapor at the first temperature at a second heat exchanger;

heating the cryogenic vapor at the first temperature via indirect heat exchange in the second heat exchanger to yield the superheated cryogenic vapor at a second temperature;

recirculating the superheated cryogenic vapor at the second temperature to the first heat exchanger;

cooling the superheated cryogenic vapor at the second temperature in the first heat exchanger to yield a cryogenic vapor at a third temperature that is colder than the superheated cryogenic vapor at the second temperature;

receiving the cryogenic vapor at the third temperature at a third heat exchanger;

heating the cryogenic vapor at the third temperature via indirect heat exchange in the third heat exchanger to yield a cryogenic vapor at a fourth temperature; and outputting, from the third heat exchanger, the cryogenic vapor at the fourth temperature to an end-user and wherein the cryogenic vapor at the fourth temperature originated from the air separation plant;

wherein the second heat exchanger and the third heat exchanger are substantially free of ice formation.

2. The method of claim 1, further comprising the steps of pumping the liquid cryogen to yield a pumped liquid cryogen and directing the pumped liquid cryogen to the first heat exchanger.

3. The method of claim 1, wherein the superheated cryogenic vapor at the second temperature is between −5° C. and 40° C.

4. The method of claim 1, wherein the second heat exchanger and third heat exchanger are forced flow water-based heat exchangers, and the step of heating the cryogenic vapor at the first temperature via indirect heat exchange in the second heat exchanger further comprises heating the cryogenic vapor at the first temperature via indirect heat exchange against a water-based solution and the step of heating the cryogenic vapor at the third temperature via indirect heat exchange in the third heat exchanger further comprises heating the cryogenic vapor at the third temperature via indirect heat exchange against the water-based solution.

5. The method of claim 4, wherein the water-based solution comprises a water-glycol solution.

* * * * *